United States Patent [19]
Coxhead

[11] Patent Number: 5,951,936
[45] Date of Patent: Sep. 14, 1999

[54] COMPACT AND TORQUE FREE SIDE ENTRY TROLLEY ROBOT

[75] Inventor: Bruce F. Coxhead, Nobelton, Canada

[73] Assignee: Husky Injection Molding Systems, Ltd., Canada

[21] Appl. No.: 09/018,582

[22] Filed: Feb. 4, 1998

Related U.S. Application Data

[62] Division of application No. 08/672,889, Jun. 28, 1996, Pat. No. 5,753,280.

[51] Int. Cl.⁶ .................................................. B29C 45/42
[52] U.S. Cl. .................... 264/328.1; 264/334; 264/336; 425/556; 425/444
[58] Field of Search .................................... 425/554, 556, 425/436 R, 436 RM, 444, 437, 139; 264/328.1, 334, 335, 336, 40.1

[56] References Cited

U.S. PATENT DOCUMENTS

| Re. 33,237 | 6/1990 | Delfer, III | 425/556 |
|---|---|---|---|
| 4,204,824 | 5/1980 | Paradis | 425/444 |
| 4,231,987 | 11/1980 | Osawa et al. | 264/334 |
| 4,449,914 | 5/1984 | Schmidts et al. | 264/334 |
| 4,571,320 | 2/1986 | Walker | 264/335 |
| 5,209,889 | 5/1993 | Brown et al. | 264/328.8 |
| 5,354,194 | 10/1994 | Kresak | 425/444 |
| 5,412,759 | 5/1995 | Yano et al. | |
| 5,513,970 | 5/1996 | Kimura et al. | 425/139 |
| 5,514,427 | 5/1996 | Ellison et al. | |
| 5,653,934 | 8/1997 | Brun, Jr. et al. | 264/334 |

*Primary Examiner*—Jill L. Heitbrink
*Attorney, Agent, or Firm*—Bachman & LaPointe, P.C.

[57] ABSTRACT

A side entry robot for removing molded articles from mold halves of a molding machine of the present invention and an associated process and molding machine are disclosed. The robot for use with the molding machine includes a device for engaging the article; a trolley for supporting and carrying the device for engaging into and out of the mold halves; a mechanism for guiding the trolley from outside the mold halves to a position between mold halves, wherein the mechanism for guiding is stationarily fixed between the mold halves and wherein the mechanism for guiding extends from outside the mold halves to between the mold halves; and a device for moving the trolley along the mechanism for guiding to a position between the mold halves and to a position outside of the mold halves.

24 Claims, 9 Drawing Sheets

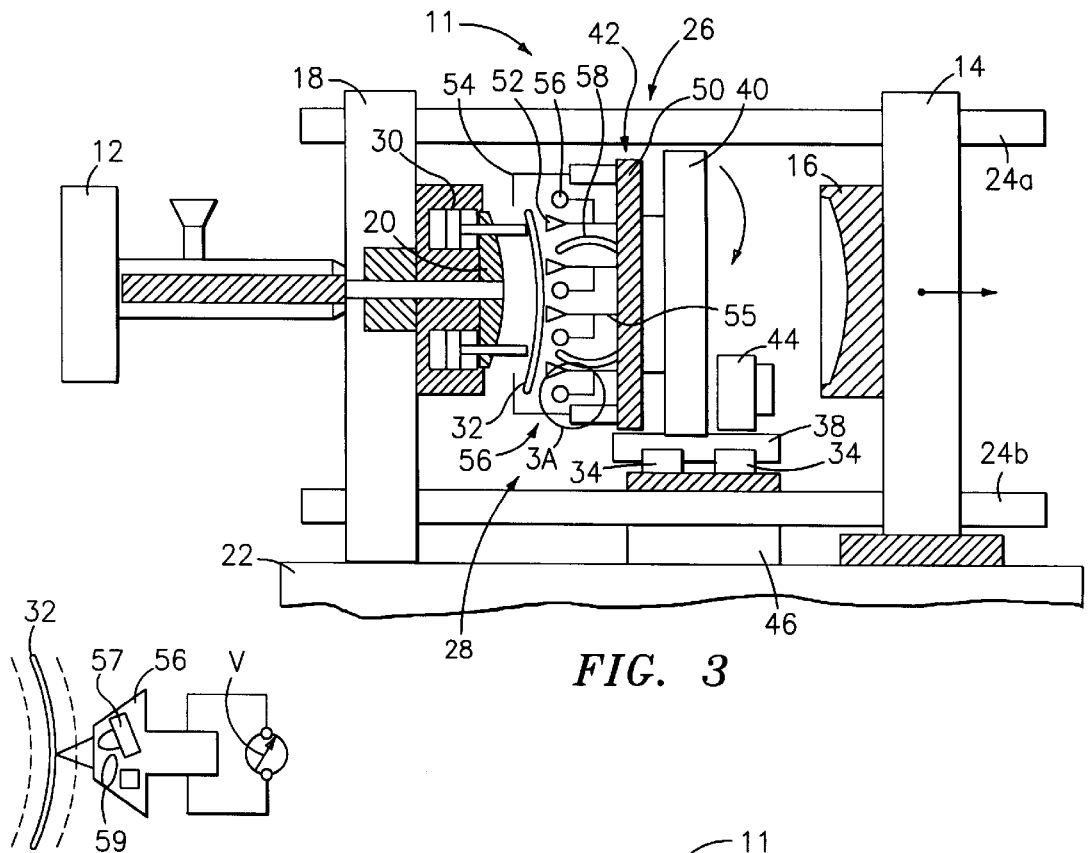
FIG. 3
FIG. 3A
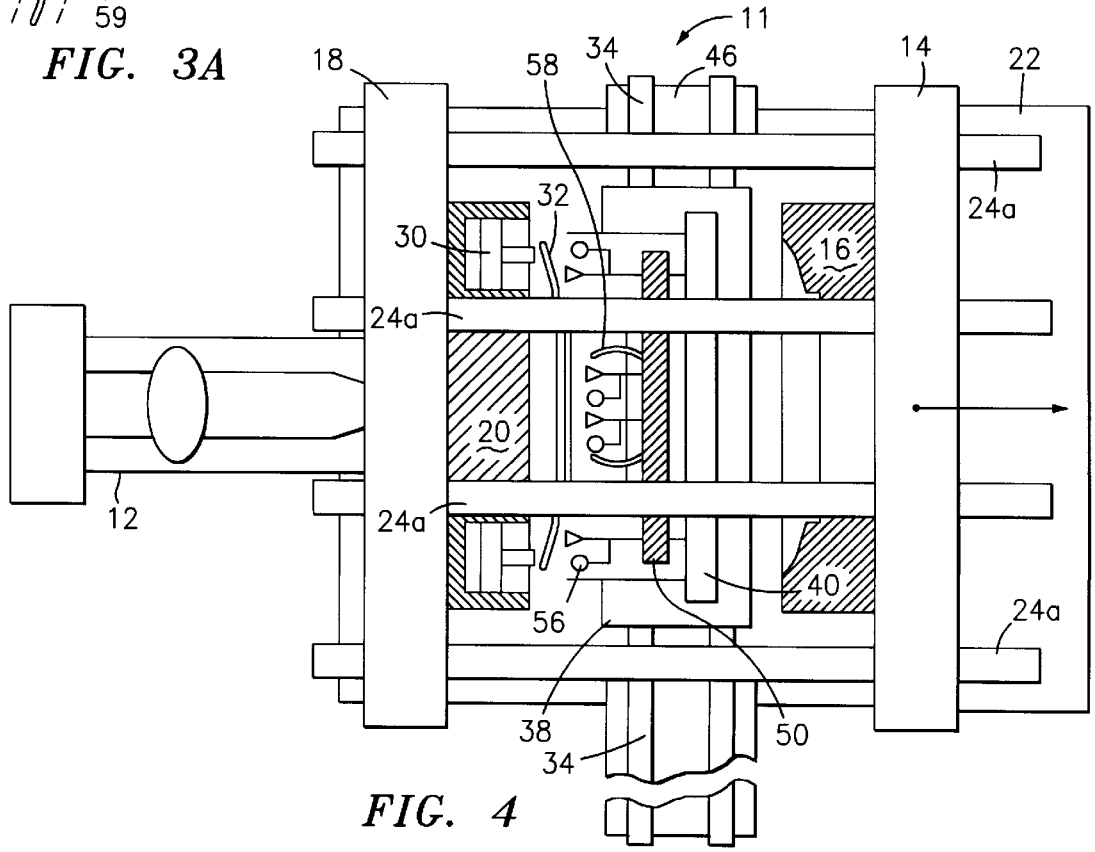
FIG. 4

COMPACT AND TORQUE FREE SIDE ENTRY TROLLEY ROBOT

This is a Division of application Ser. No. 08/672,889, filed Jun. 28, 1996, now U.S. Pat. No. 5,753,280.

BACKGROUND OF THE INVENTION

This invention is directed to robots for use with molding machines, and more particularly, to a side entry robot having a take-out plate with molded article engagement means mounted on a trolley which is movable in its entirety by guides into position between mold halves of an injection molding machine and into position outside of the mold halves of the injection molding machine.

In the plastic injection molding industry, there are several types of take-out robots which are used for a broad range of applications. Depending on the application, the robot may be universal or may require a very particular design. In general, these robots may be classified based on the way they enter the molding area, i.e., through a simple translation movement such as top entry, side entry and bottom entry. Another type of take-out robot which is sometimes used consists of those which use rotation to handle and take-out a molded part. These types of robots include a swing type, pivoting type or turret type robot. In the automotive industry, legged walking robots are sometimes used for various tasks, such as that disclosed in U.S. Pat. No. 5,459,659.

The prior art includes numerous side entry robots. For application to the handling requirements of many molding procedures, these side entry robots require conceptual design modifications in order to meet such handling requirements due to over-sized and over-weight molded articles. This is particularly true in the automotive industry or when it is desired to achieve a smaller footprint on the manufacturing floor. That is, in most cases, side entry robots have been designed and used for handling a plurality of small and light molded parts.

For example, U.S. Pat. No. 4,204,824 to Paradis discloses a side entry mechanical robot which is driven in and out by the racks and gears operated during the clamp motion of the mold with which it is used. A slippable clutch is used between the racks to control the precise positions of the robot. The tooling head makes one 90° flip in the out position which is achieved by a cam. Adjustable spring loaded bumpers are shown to control the end stops of the motions.

U.S. Pat. No. 33,237 to Delfer teaches a side entry, multiposition air robot which is adapted to be stopped mechanically in different "in" and "out" locations by an adjustable hydraulically controlled cylinder. The robot carries a cooled series of preform tubes to hold more than one cycle's productions of preforms. The advantage of this robot is to replace a cooling conveyor with an improved cooled robot storage plate for handling up to three cycles at a time.

U.S. Pat. No. 5,354,194 to Kresak discloses a servo driven side entry robot with a single, composite, piece-part trolley straddling a guiding/support boom. This design is especially suitable for high speed robots that could handle very light, small, single or multiple molded parts, as will be discussed below.

The patents to Paradis, Delfer and Kresak disclose very similar mechanical designs of the support means and moving means of each of the robot's take-out plate. These designs cannot be advantageously and effectively used for handling and moving large parts, such as certain molded parts in the automotive industry. For example, the robot of Kresak discloses boom means that are attached to a machine platen in a cantilever position that is prone to bending and vibrations. As shown in FIG. 1 thereof, boom means 22 is entirely positioned outside the molding area formed by mold halves 13 and 14 in a cantilevered support mode. A trolley means 23 which is displaced along boom means 22 does not enter the molding area and does not pass the lateral tiebars. In order to remove very light molded articles from the molding area, robot take-out plate 27 has been designed as a very long arm that is remotely secured in a cantilevered mode to trolley means 23. The lateral shift of the take-out plate with respect to the trolley means through the arm allows the robot take-out plate to freely reach the molding area while keeping trolley means 23 outside and very close to the lateral tiebars. This is a common and major drawback of the cantilevered type side entry robots for their application to handling large and heavy molded articles.

Referring now to FIG. 1 of the present application, a typical prior art side entry trolley robot with cantilevered connection means, similar to those discussed above, is shown. In this prior art robot, trolley means 1 is guided and travels over a distance L along boom means 2 and boom means 2 is placed outside both the molding area 3 and lateral tiebars 4. Boom means 2 is also attached to machine platen 5 in a cantilevered mode through connecting means 6 of boom means 2. Trolley means 1 do not pass by the tiebars and thus does not reach the molding area. Only the end portion 7 of take-out plate 8 comprising gripping means array 9 is moved in-between mold halves 10 to remove the molded articles. As shown in FIG. 1, a constant momentum arm M1 and a variable momentum arm M2 are generated by using this type of cantilevered take-out plate 8 and respectively cantilevered boom means 2. Constant momentum arm M1 extends between axis A—A, which passes through the center of the end portion of take-out plate 8 and up to axis B—B, that passes through the centers of trolley means 1 and connecting means 6 of the take-out plate. Variable momentum arm M2 extends between connecting means 6 and connecting means 13 of the take-out plate. Momentum reaches it maximum value when trolley means 1 reaches it outermost lateral position. Accordingly, there is a constant torque that is applied to the connecting means 6 and to connecting means 13. There is also a variable torque that is applied to connecting means 6 of boom means 2. When handling over-sized molded articles having significant weight, torque becomes a significant problem since is causes vibration and bending of the robot take-out plate and of the boom means.

U.S. Pat. No. 4,571,230 to Walker discloses a side entry robot using suction cups that enters a vertical press mold to both load and unload a vertical press with sheet molded parts, in a two-step process. For large and heavy parts, the design of the Walker robot is not advantageously applicable. That is, unacceptable torque and vibration will be generated upon arm 12 during high speed handling of molded articles, particularly heavy ones, since the mechanical design of the robot lacks stiffness.

With particular reference to the automotive industry, robots therein are intensely used to deal with tasks involving small and medium articles such as for inserting cylinder liners into cylinder blocks, as disclosed in European Patent Application 646,440; attaching a sub-assembly such as strut to the vehicle body frame, as shown in EPA 117,976; and painting and welding body parts, as shown in U.S. Pat. No. 5,412,759. As each of these robots disclose, they are designated for use with small parts or for performing tasks which do not require the lifting of large parts. The use of any of these devices applied to the molding of large parts would be unsuccessful.

The new trend in the automobile industry towards an increased use of larger and larger plastic body panels requires that the robots capable of handling these over sized parts have to be more carefully designed to meet stringent injection molding cycle times. If additional operations have to be carried out within the molding area, the final configuration of the robots need to address other handling sequences and molding scenarios as well. In this regard, reference is made to U.S. Pat. No. 5,514,427 to Ellison, that teaches a method of decorating large body panels during the molding process of the "virgin" plastic part. As shown in FIG. 1, a plastic sheet film comprising a decoration is brought from the top of the movable platen to in between the mold halves in order to inject a body part that will comprise a decorated side. As it clearly appears from FIG. 1, a top entry robot may not be capable of handling this type of large body since the decorating film is continuously supplied from a roll placed on top of the movable platen.

Another example of a molding system requiring a robot design in accordance with the present invention, is in conjunction with an injection molding machine having several mold stations placed side by side, wherein one large plastic panel has to be rapidly and very accurately transferred from one mold station to another. This system is used for sequential injection of different materials using at least two molds and here again, the robot has to be stiff, fast, and torque and vibration free.

There exists a need, therefore, for an improved side entry robot, by which vibrations and bending are substantially reduced and stiffness and reliability are increased, providing a robot capable of handling large parts.

SUMMARY OF THE INVENTION

The primary object of this invention is to provide an injection molding system and method which includes an improved side entry robot for handling large parts.

Another object of this invention is to provide a side entry robot for use with molding machines which is able to efficiently and effectively handle large molded articles.

Still another object of this invention is to provide an improved space and time efficient side entry robot for removing molded articles from a mold of an injection molding machine.

And yet another object of this invention is to provide an improved side entry robot for use with a molding machine which maintains stiffness and reliability when used with large parts and when operating at high speeds.

Still another object of this invention is to provide an improved side entry robot for use with a molding machine which comprises very few and simple mechanical moving parts.

And yet another object of this invention is to provide an improved side entry robot for use with a molding machine which is movable in its entirety into a molding area for removing a molded article.

And still another object of this invention is to provide an improved side entry robot for use with a molding machine having a movable trolley and take-out means which are subject to only a minimum amount of torque.

And yet another object of this invention is to provide an injection molding system and method including a part removal station comprised of a side entry trolley robot, which robot enters entirely into the molding area of the machine for removing molded parts and which minimizes potentially damaging bending moments.

And another object of this invention is to provide an injection molding system and method including a molded article removal mechanism which comprises a floor based side entry robot, which design reduces vibrations and bending of the robot while a molded article is being manipulated from inside the molding area to outside the molding area.

The objects and advantages disclosed herein are achieved by the side entry robot of the present invention for removing molded articles from mold halves of a molding machine and an associated process and molding machine. The robot for use with the molding machine comprises a device for engaging the article and a trolley means for supporting and carrying the device for engaging into and out of the mold halves. A mechanism is used for guiding the trolley from outside the mold halves to a position between the mold halves, wherein the mechanism for guiding is stationarily fixed between the mold halves and wherein the mechanism for guiding extends from outside the mold halves to between the mold halves. A device for moving the trolley along the mechanism for guiding to a position between the mold halves and to a position outside of the mold halves is also provided.

The injection molding machine of the present invention comprises a stationary platen, a movable platen, and mold halves including a movable mold half on the movable platen and a stationary mold half on the stationary platen. The movable mold half and the stationary mold half form a mold. The machine further includes means for injecting molten resin into the mold, means for controlling movement of the movable platen relative the stationary platen, and a molded article removal system juxtaposed the mold halves. The removal system includes means for engaging the article and a trolley means for supporting and moving the means for engaging into and out of the mold. Means for guiding is provided for guiding the trolley means from a first position outside the mold halves to a second position between the mold halves. At least a portion of the means for guiding is adapted to be positioned between the mold halves and extends from outside the mold halves to between the mold halves. Further means are provided for moving the trolley means along the means for guiding to the second position between the mold halves and to the first position outside of the mold halves.

The method of the present invention for molding an article with an injection molding machine and removing a molded article from the injection molding machine, comprises the steps of: clamping mold halves of the injection molding machine for forming a mold; injecting molten resin into the mold; separating the mold halves; ejecting the molded article from the mold; moving an article removal means from a position outside the mold halves to a position between the mold halves in substantial synchronization with the step of ejecting; guiding the removal means to the position between the mold halves and to the position outside of the mold halves; engaging the article with the article removal means; and removing the article removal means from the position between the mold halves along with the molded article, wherein the step of guiding is achieved using stationarily guide means fixed between the mold halves.

The details of the present invention are set out in the following description and drawings wherein like reference characters depict like elements.

BRIEF DESCRIPTION OF THE DRAWINGS

FIG. 3 is a side elevational view of an injection molding machine using a side entry trolley robot in accordance with the principles of the present invention;

FIG. 3A is an enlarged view of the circled area shown in FIG. 3;

FIG. 4 is a top view taken along line 4—4 of FIG. 3;

DETAILED DESCRIPTION OF THE PREFERRED EMBODIMENT

Figure 1:
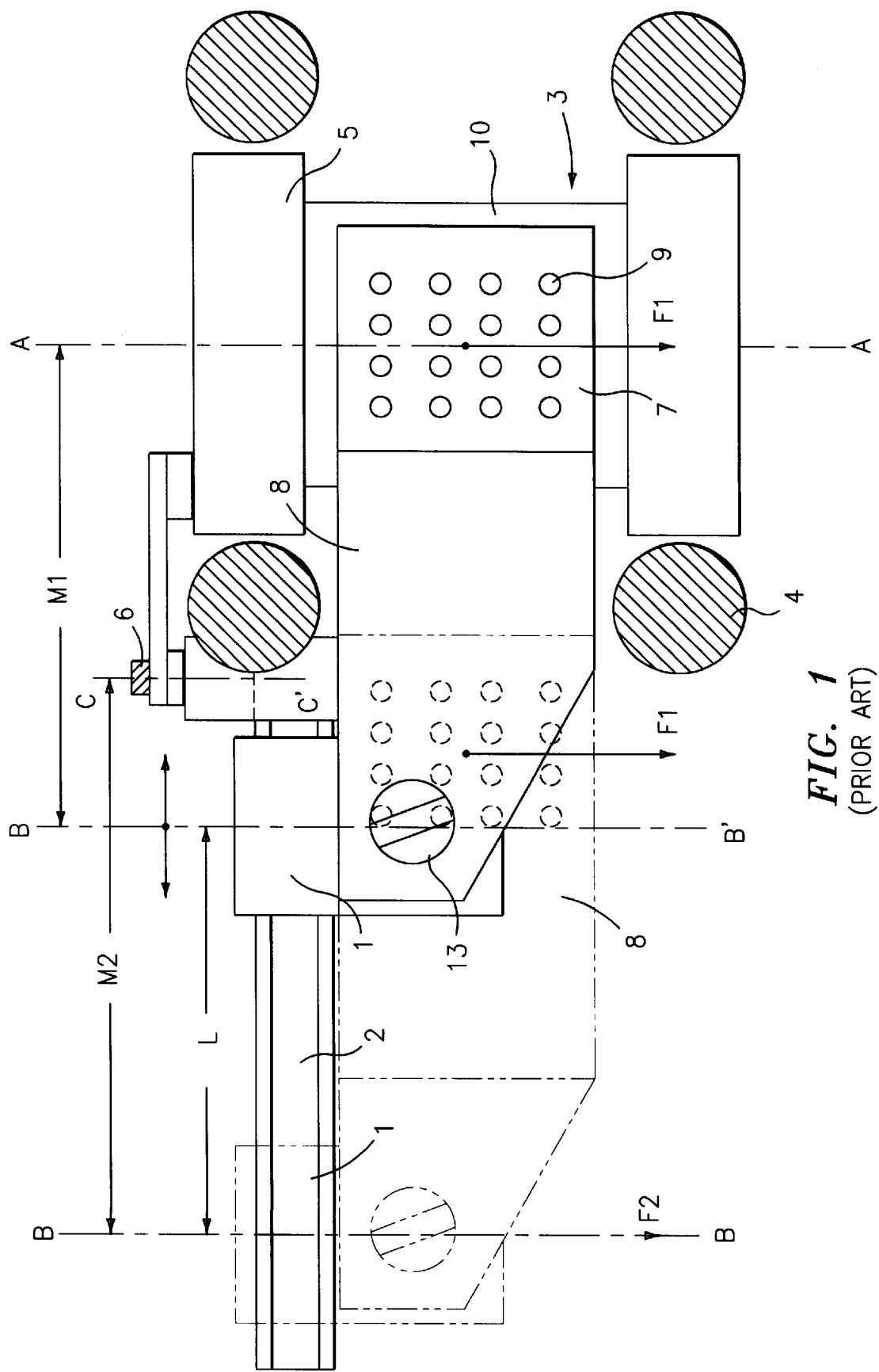
FIG. 1 is a schematic view of a prior art injection molding machine molded and part-removal cantilevered robot.
Figure 2:
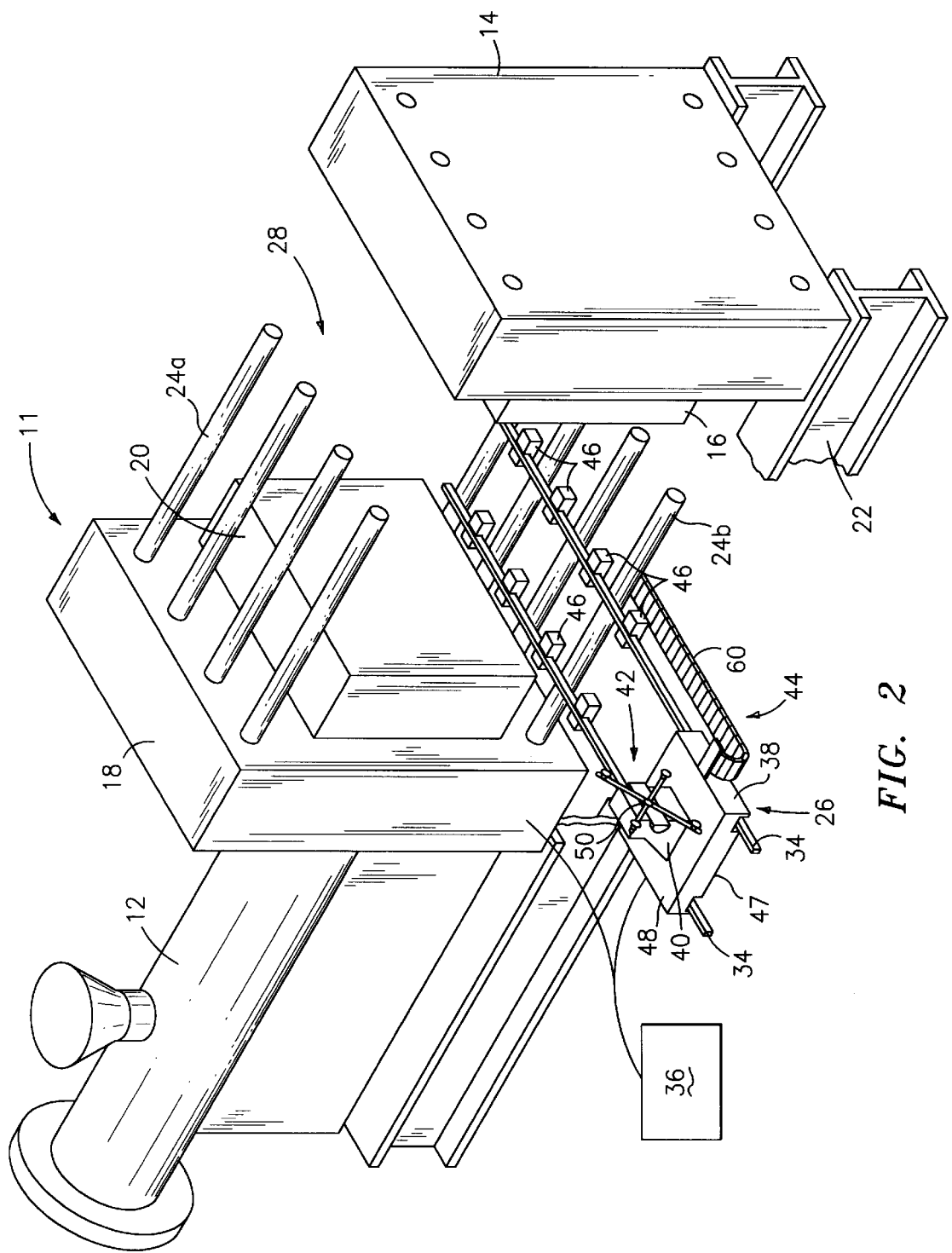
FIG. 2 is a perspective view of an injection molding machine having a side entry robot in accordance with the principles of the present invention.

Referring now to the drawings in detail, there is shown in FIG. 2 a perspective view of an injection molding system designed in accordance with the principles of the present invention, designated generally as 11. System 11 generally includes an injection unit 12 for injecting molten resin into a mold, a movable platen 14 with a movable mold half 16, a stationary platen 18 with a stationary mold half 20, machine support base 22, upper and lower tiebars 24a and 24b for guiding and controlling movement of the platens, respectively, and a side entry robot 26, movable into and out of, in its entirety, molding area 28 defined between mold halves 16 and 20.

Referring to FIGS. 2–4, stationary mold half 20 preferably includes ejector mechanisms 30 therein, the design of which is not critical and is known in the art, for ejecting finished molded articles 32 from the mold defined by mold halves 16 and 20.

Side entry robot 26 is designed to move into and out of molding area 28, substantially in its entirety, on guiding tracks or rails 34. Tracks 34 extend from a position outside the molding area to a position substantially inside the molding area. A controller 36, as shown schematically in FIG. 2, is provided for synchronizing the movement of robot 26 into molding area 28 with the ejection of molded articles 32 via ejector mechanisms 30 from mold halves 16 and 20, on tracks 34. Accordingly, with mold halves 16 and 20 substantially in the open position as shown in the FIGS. 2–4, controller 36 is operative to move side entry robot 26 along guiding tracks 34 into molding area 28 from a position outside the molding area for removing a least one molded article 32 and after engagement with the molded article, from said molding area back to the position outside outside of the molding area.

Referring to FIG. 2, side entry robot 26 includes a trolley 38 movable over guiding tracks 34, take-out plate 40, and molded article gripping means 42 for engaging the molded article attached to take-out plate 40. Trolley 38 is moved over guiding tracks 34 via motive mechanism 44 which is controlled by controller 36 for synchronizing the ejector mechanisms 30 with the placement of trolley 38 at the proper location in molding area 28 for gripping or engaging molded article 32.

Referring to FIGS. 2 and 3, guiding tracks 34 preferably extend over lower tiebars 24b, and rest on track supports 46 placed in between the lower tiebars so that the guiding tracks are placed slightly over the tiebars. Trolley 38, in this embodiment, preferably comprises a base which extends horizontally forming a horizontally flat upper and lower surface, wherein the lower surface 47 is attached for relative movement on tracks 34 via known methods, such as bearings, bushings or the like. Take-out plate 40 extends from upper surface 48 of trolley 38, and extends in a substantially vertical orientation, while being rigidly secured to trolley 38. A services plate 50, shown in FIGS. 2 and 3, is provided and extends substantially parallel to take-out plate 40 and is preferably rigidly connected thereto. Gripping means 42 and other services, for example, cooling nozzles, which are discussed in further detail below, are located and supported by services plate 50 and thereby supported and carried by trolley 38.

As shown in FIG. 3, gripping means 42 are preferably in the form of vacuum cups 52 used to suction molded article 32 for holding the same. Gripping means 42 also includes mechanical grippers 54 used to firmly hold the article while the vacuum cups are attached. Vacuum cups 52 are preferably attached to arms 55 which extend at different lengths so as to allow the grasping of differently shaped molded articles 32. Accordingly, if a specifically shaped article is being molded, the vacuum cups may be arranged in the shape of the articles via arm length adjustment so as to provide the proper suction for firmly gripping molded article 32.

Services plate 50 also preferably includes sensors, preferably optical non-contact sensors 56, shown in FIG. 3, for detecting the presence of molded article 32 and/or to confirm the effectiveness of the suction of vacuum cups 52 or the gripping of mechanical grippers 54. Sensors 56 are preferably operative with controller 36, shown in FIG. 2, indicating to the same when the appropriate time for removing trolley 38 from molding area 28 has occurred. As shown in FIG. 3A, the non-contact sensor may be in the form of a miniature light source 57, such as an LED and a reflective/scattering light sensor, in conjunction with a micro-lens 59, to generate different voltage signals V that are proportional to the axial shift of the molded article with respect to the optimum position of the molded article in the vicinity of the sensor. The amplitude of the electrical signal generated by each sensor that is proportional to the distance between the sensor and the article, is also influenced by the surface roughness of the part. If there is not a part within the sensing range of the sensors, then no electrical signal is generated by the sensor and this represents an indication that part of the molded article 32 or the whole article has not been properly handled by the robot's take-out plate 40 and its associated gripping means 42. This would trigger, as mentioned above, appropriate decisions to be taken by controller 36 of system 11 in regard to the ejection process of article 32 and subsequent handling of the same.

Services plate 50, as mentioned above, may also include cooling nozzles 58, as shown in FIGS. 3 and 4, for cooling molded article 32 during injection via ejector mechanisms 30. Accordingly, damage as a result of gripping means 42 contacting a molded article 32 is avoided by cooling the article before removal.

Figure 8:
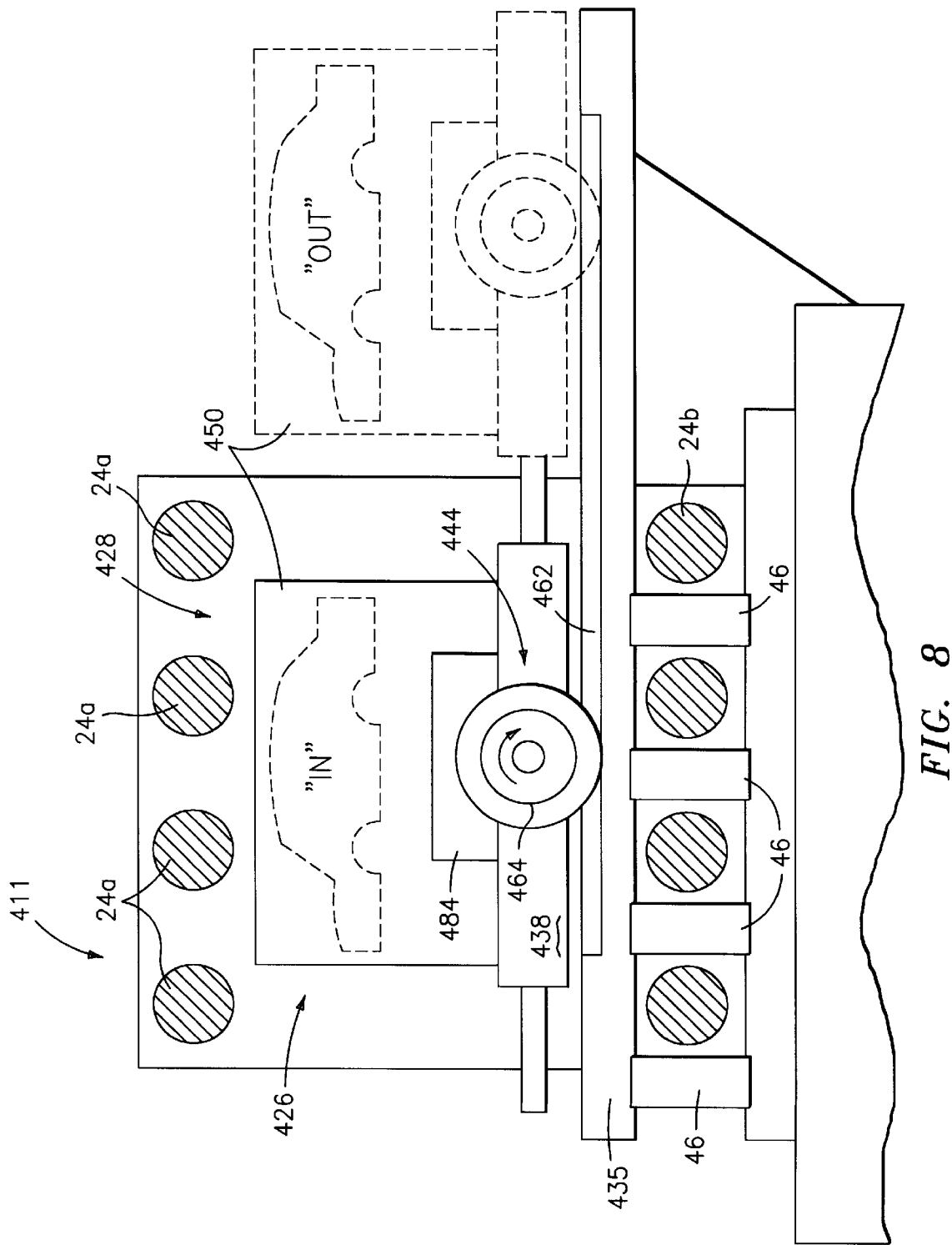
FIG. 8 is an end view of another embodiment of the robot and molding system of this invention.

Referring to FIGS. 2 and 3, motive mechanism 44 may be in the form of a belt and drive (not shown) for moving trolley 38 over guiding tracks 34 into molding area 28 from a position entirely outside the molding area. In this respect, the robot in its entirety is moved into and out of the molding area. Alternatively, motive mechanism 44 may be in the form of a rack 462 and pinion 464, as shown in FIG. 8, driven by a servo motor or the like (not shown) discussed in detail below.

Alternative embodiments are described below. Reference numerals similar to the numerals set forth above in the description of system 11 designate like elements. The same elements which are considered important to the understanding of the Figure are give the same numbers as in system 11 or another embodied system but not described again. Elements which differ from system 11 are described in the necessary detail.

Figure 5:
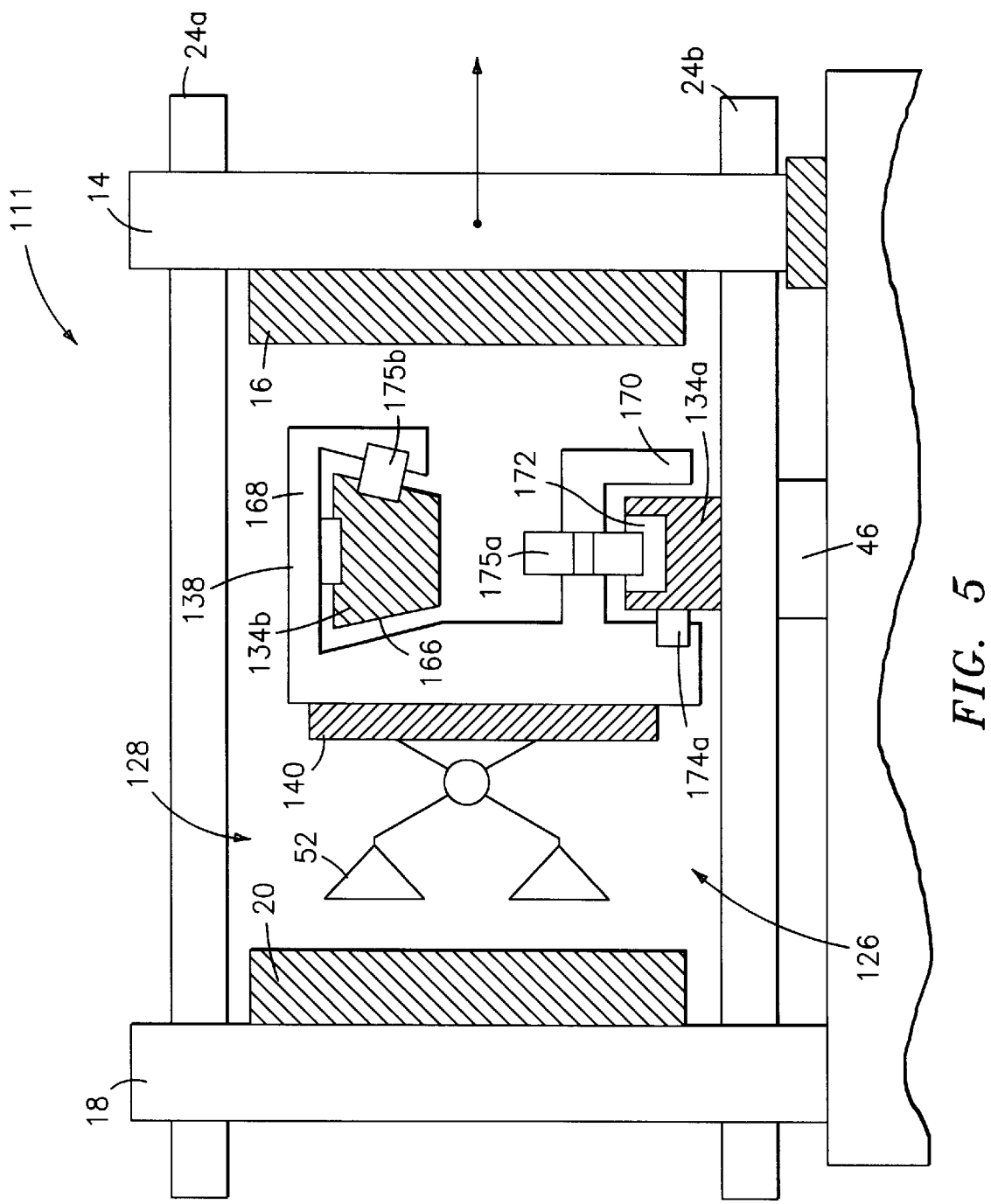
FIG. 5 is a side elevational view of an alternative embodiment of an injection molding system of the present invention, which embodiment uses a side entry robot having a vertically extending side entry trolley, in accordance with the principles of the present invention.

Referring now to FIG. 5, an alternative embodiment of injection molding system 11 of the present invention is shown, which is designated generally as 111. The primary difference between the embodiment shown in FIG. 5 and the embodiment shown in FIGS. 2–4, is the use of a vertically oriented take-out trolley 138 which substantially comprises a vertically oriented base. The vertically oriented takeout trolley 138 is particularly applicable to molding machines where, for reasons known in the art, the stroke shutheight of the machine is limited. By using the vertically oriented take-out plate, less space is required between the mold halves to move in robot 126. As shown in FIG. 5, for the vertically oriented take-out plate 140, instead of two guide tracks oriented in a horizonal plane as with the FIGS. 2–4, two guide tracks 134a and 134b, positioned one above the other are used which are oriented in a shared vertical plane. In the embodiment shown, vertically oriented trolley 138 preferably has overall C-shape with an upper portion 168 for engaging guide track 134b and a lower portion 170 including elements for engaging guide track 134a. The elements used for engaging guide track 134a and for moving robot 126 into and out of molding area 128 preferably comprise a rack 172 and pinion 174 and a servo motor (not shown). The pinion 174 is connected to a shaft (not shown) of a servo motor which travels together with trolley 138 along guide track 134a. For assisting in accurate alignment and the free travel of trolley 138, rollers 175a and 175b are used in conjunction with guiding tracks 134a and 134b, as shown. Guiding tracks 134a and 134b in this embodiment, are preferably especially profiled in the shape 166 to increase the accuracy of alignment and to increase the smooth and friction free travel of trolley 138.

Figure 6:
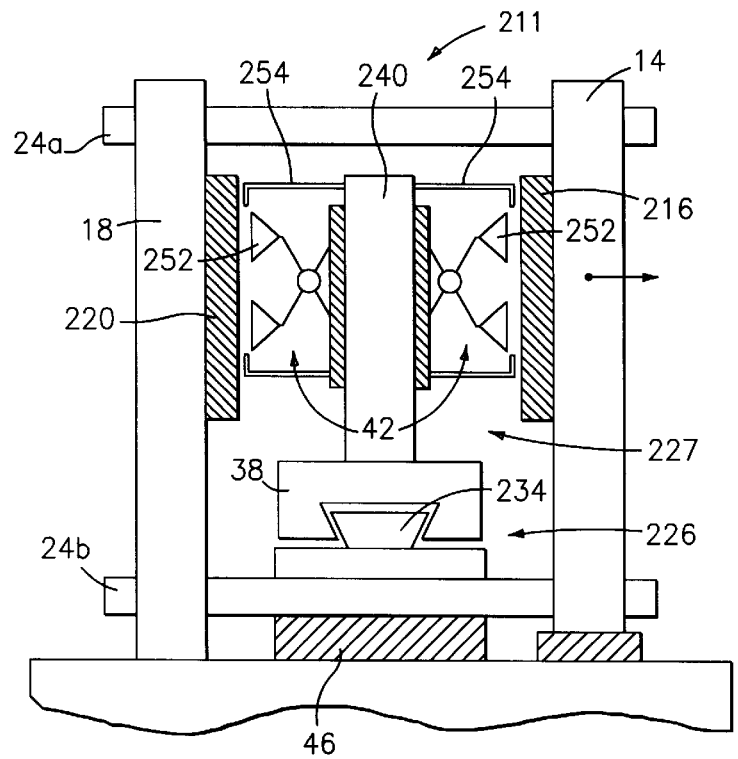
FIG. 6 is a side elevational view of an injection molding system including a side entry robot, which system is in the form of a tandem or stack molding machine and which robot includes a take-out plate having gripping means on both sides for removing molded articles from both molding areas of the molds of the molding machine.

FIG. 6 shows another embodiment of side entry robot of the present invention, designated as system 211. System 211 is used for various practical applications where the molded article may be ejected from a cavity side rather than from the core side. Accordingly, grippers 254 and vacuum cups 252 are provided on both sides of take-out plate 240, between movable mold half 216 and stationary mold half 220. Both scenarios are provided for by robot 226, i.e. for the instances where the molded article is maintained with either of the core or cavity of mold 227. As an additional alternative, system 211 uses a single guide track 234 design, which is also applicable to the embodiments discussed above. Accordingly, the guiding mechanism, using the one guide track 234, is simplified. As an additional embodiment (not shown), it is also possible to provide take-out plate 240 with one set of mechanical grippers and vacuum cups on one side thereof and to provide additional pivoting means to rotate the one set and allow the molding and removal of the molded article regardless as to the side from which it is ejected. Accordingly, the entire robot or simply the take-out plate would rotate depending on which side the molded article, i.e. the core side or the cavity side, is being ejected from.

Figure 7:
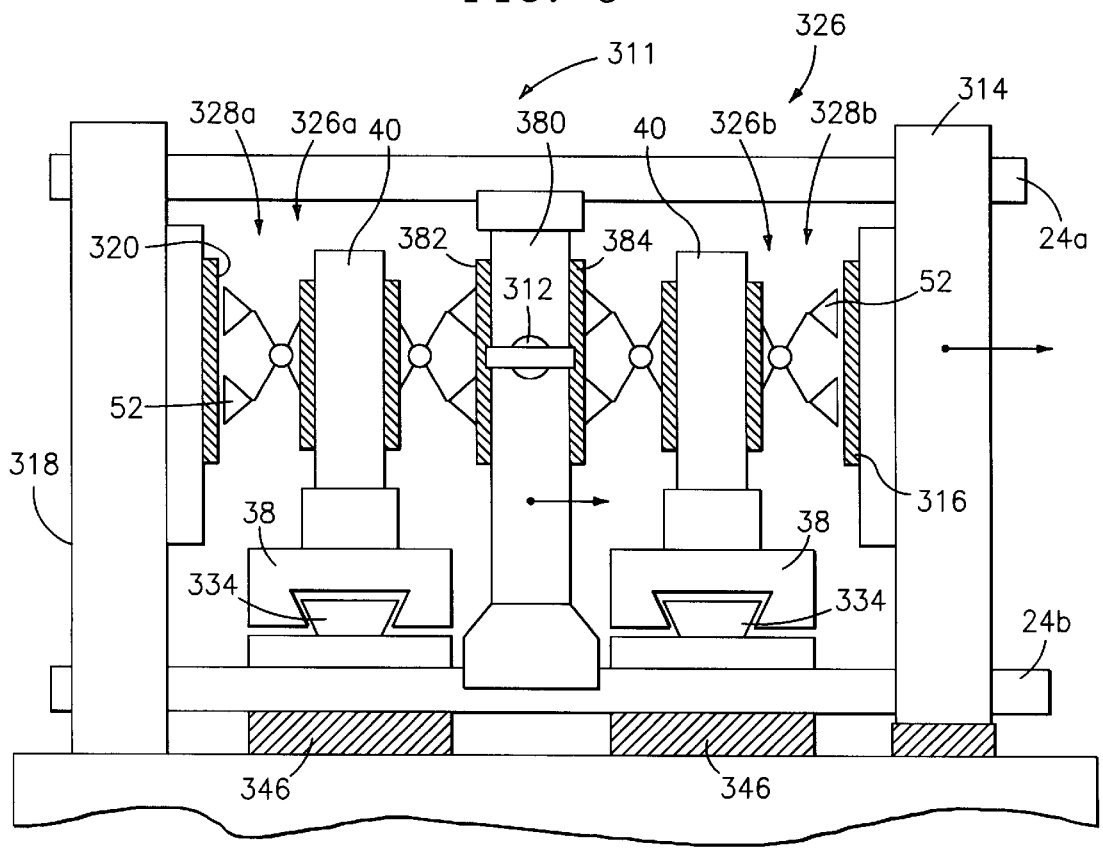
FIG. 7 is a side elevational view of another embodiment of the robot and molding system of this invention.

Referring now to FIG. 7, another embodiment of system 11 is shown and is designated as system 311. In this embodiment, robots 326 are shown as used with a stack mold injection molding machine. Alternatively, the same or similar arrangement may be used with a tandem injection molding machine (not shown). Such molding machines are shown in U.S. Pat. No. 4,867,938 and U.S. Pat. No. 4,929,166 assigned to the assignee of the present invention. In addition to stationary platen 318 and movable platen 314, stack mold system 311 includes a central movable platen 380 having movable mold halves 382 and 384 thereon. Accordingly, two molding areas 328a and 328b are formed by mold halves 320 and 382 and mold halves 316 and 384. Robots 326a and 326b are similar to as those described in embodiment 211, shown in FIG. 6 and designated as robot 226. Accordingly, each of robots 326a and 326b are movable into molding areas 328a and 328b, respectively, and in accordance with as described above for robot 26 of system 11 of FIGS. 2–4, and as discussed above for embodiment 211. An injection unit 312 is provided for providing molten resin to the multiple molds created by the multiple mold halves, as is known in the art. Additional features as described above including the controller, cooling nozzles, ejector mechanisms, etc., can also be used with system 311.

Figure 7A:
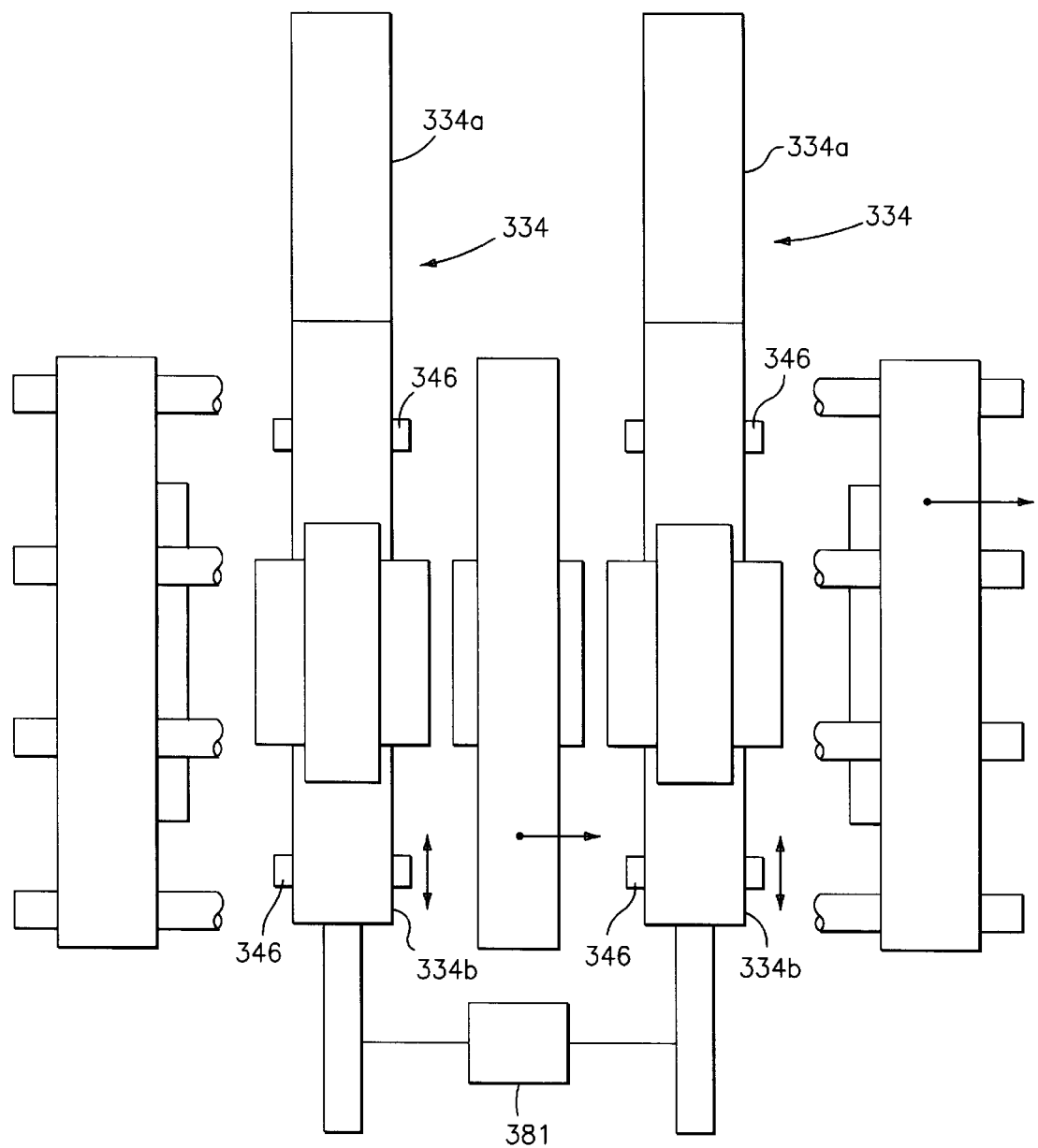
FIG. 7A is a simplified top view of the molding system shown in FIG. 7.

For the stack mold embodiment shown in FIG. 7, where more than one movable machine platen is used, for example, platens 314 and 380, guide tracks placed above the tiebars, as described above, may obstruct free movement of the movable platens carrying the mold halves. Accordingly, and referring to FIG. 7A, in this embodiment, means 381 (shown schematically) are provided to translate supports 346 and also a portion 334b of guiding tracks in correlation with the opening/closing sequences of the mold stations. To achieve this, guiding tracks 334 are not continuous but are made of at least two separate portions, stationary portion 334a and movable portion 334b which are adapted to connect and disconnect. Portion 334a of the guiding tracks is stationarily positioned outside of the mold area and remains in a stationary position which corresponds to the open area between mold halves when the mold stations are open. Portion 334b of the guiding tracks can be extended into the mold area as it is movable back and forth, as indicated by the arrow, in correlation with the opening of the mold stations so that when the mold stations are in the full open position, the movable portion and the stationary appear as continuous connected track 334. In this position, the robot is able to enter the molding areas by engaging its pinion, such as that shown as 175a in FIG. 5, with the movable section of the guiding tracks and supports.

For a tandem injection molding machine embodiment (not shown), a simple trolley robot and take-out plate may be used by adding a movement sequence and additional guiding track means for the robot which are perpendicular to the existing ones. Accordingly, the robot is able to travel from one molding station to the other during the injection step. This single robot configuration is efficiently operative in the particular case where the mold stations are operated sequentially such that the movement between the stations of the trolley would take place during the injection time of one station.

Another embodiment is shown in FIG. 8 and is, for example, particularly applicable to the automotive industry. System 411 includes robot 426 which includes motive mechanism 444, similar to as described above, but which is directly attached with services plate 450 carried on trolley 438. Motive mechanism 444 includes a rack 462 and pinion 464 used to translate trolley 438 in and out of molding area 428 which is actuated via a motor means 484. By providing motive mechanism 444 with services plate 450 as shown, the overall foot print of the injection molding machine is reduced, making the entire robot 426 an independent and modular piece of equipment, adaptable to a broad range of applications, which is easy to assemble and service.

Figure 9A:
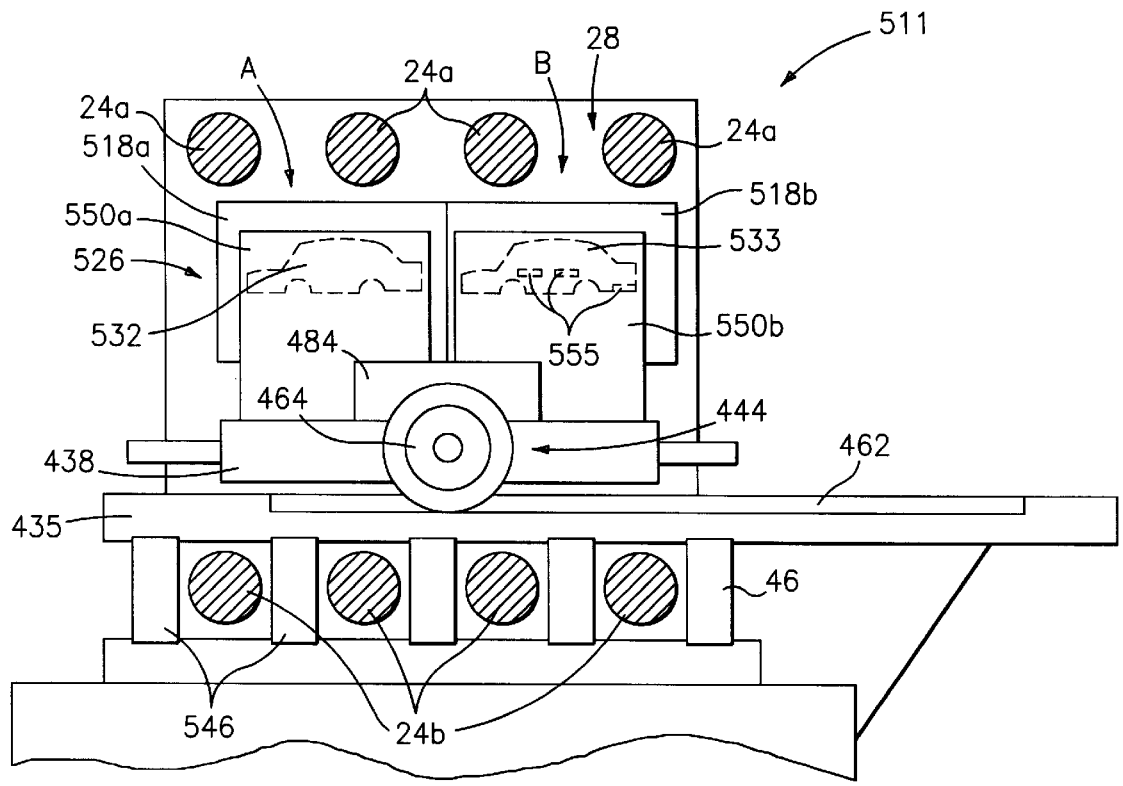
FIGS. 9A and 9B are side elevational views of several positions of another embodiment of the present invention wherein the side entry robot is used to serve an injection molding machine that has two molds.
Figure 9B:
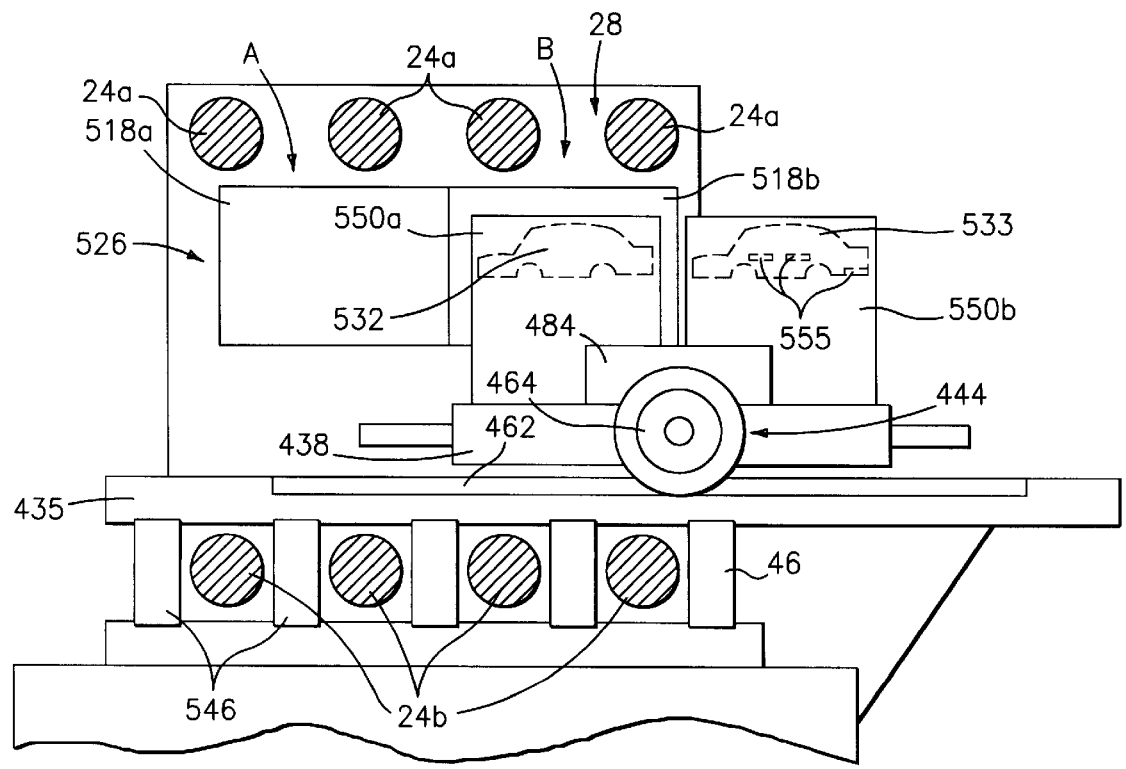

Referring now to FIGS. 9a and 9b, system 511 in accordance with the principals of the present invention is shown for use with single station injection molding machines that use at least two separate molds A and B including mold halves 518a and 518b arranged side by side, respectively. Accordingly, a single molded article 532 is partly injected in mold A, for example, and is then transferred or shuttled by side entry robot 526 to an adjacent mold, mold B, for example, to continue and finalize the injection molding process, for forming a finish molded article 533. Referring to FIG. 9A, side entry trolley robot 526, in accordance with the present invention, includes two take-out plates (not shown) and two services plates 550a and 550b, each being substantially identical with services plate 50, described in the embodiments shown FIGS. 3 and 4. Accordingly, in this embodiment, final molded article 533 is first molded as molded article 532 in mold A using one resin. Article 532 is then ejected from mold A and is moved by side entry trolley robot 526 to mold B where a second resin is injected preferably in select areas, such as areas 555. Accordingly, and referring to FIG. 9A, the right handed take-out plate including services plate 550b first receives a first initial molded article 532 from mold A. Robot 526 is then shifted so that first initial molded article 532 is moved to mold B, whereat a first finish molded article 533 is formed. In the left handed take-out plate including services plate 550a, a second initial molded article 532 is removed from mold A and when first finish article 533 is complete in mold B, robot 526 is again shuttled to the right as shown in FIG. 9b for finish molding the second initial molded article 532 belonging to services plate 550a. Preferably, each initial molded article 532 is molded in mold A using one resin and is moved by side entry trolley 538 to mold B where a second resin is used for molding in selected areas 555. While the services plate 550a awaits for finish molded article 533, the previously completed finish molded article having been molded using both resins is carried out of mold area 528 by robot 526 for subsequent handling and processing.

Figure 10:
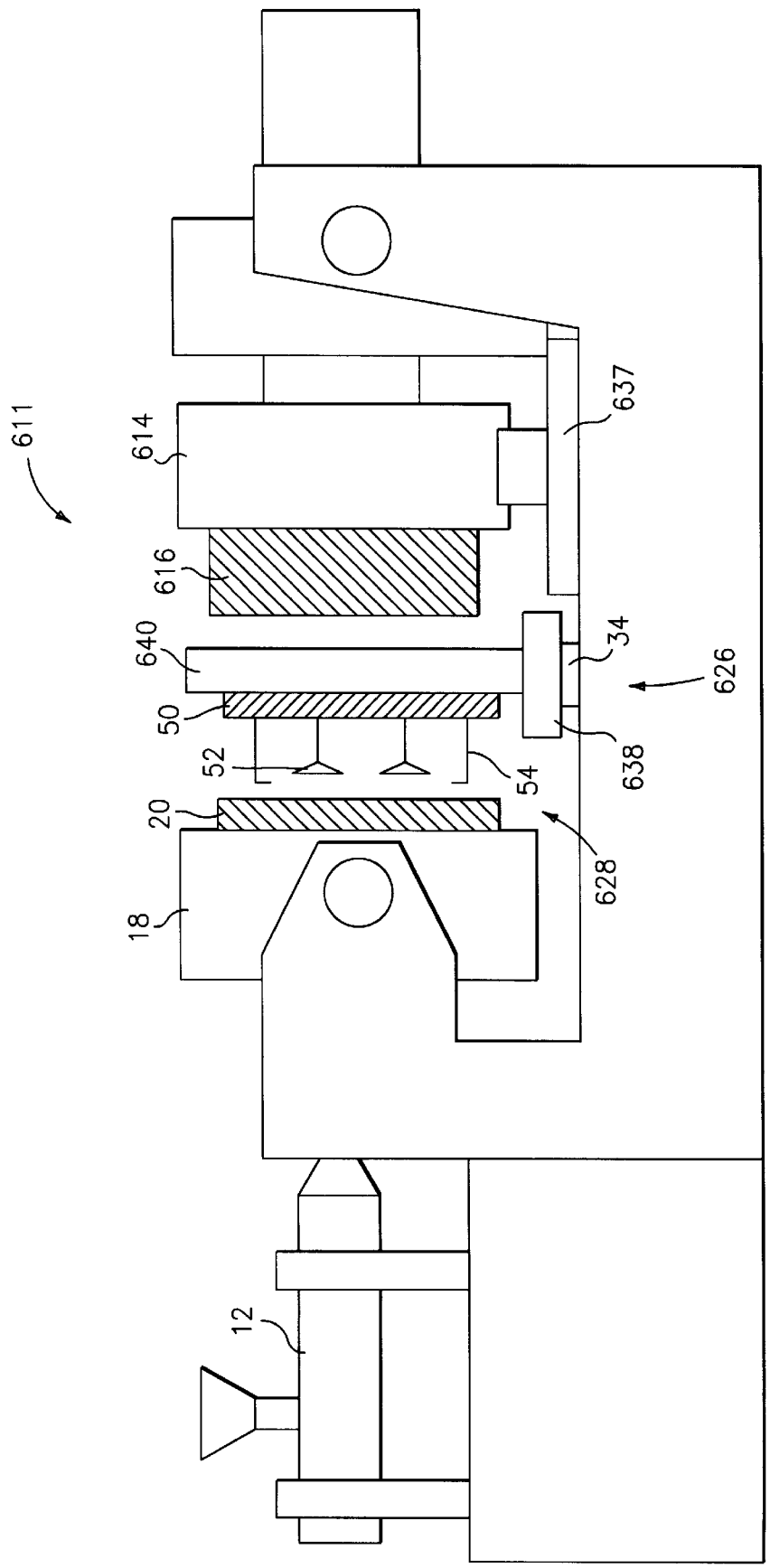
FIG. 10 is a side elevational view of an embodiment of the present invention wherein the side entry robot is used to serve a tiebarless injection molding machine.

Referring now to FIG. 10 another embodiment of the side entry robot in accordance with the present invention is shown which is used advantageously in conjunction with a tiebarless injection molding machine. In this embodiment, the access of the side entry trolley robot 626 inside molding areas 628 is more easily obtained since no tiebars have to be considered in relation to the positioning and support of the guiding tracks which, in this case, have move room for optimal installation. For this tiebarless design, movable machine platen 614 carrying movable mold half 616 slides on guiding rail 637 which has a limited length that does not obstruct the travel of trolley 638 with take-out plate 640 thereon into mold area 628.

In operation, and referring to FIGS. 2–4, system 11 provides for efficient and reliable handling of larger molded parts due to its non-cantilevered and substantially torque-free design. Accordingly, when system 11 is in the open position as shown in FIGS. 2–4, controller 36 is operative to signal robot 26 to move into molding area 28 to remove a molded article 32 therefrom. Accordingly, a servo motor or other source activates motive mechanism 44, preferably in the form of a rack and pinion or belt drive, causing trolley 38 to move along guide tracks 34a and 34b into molding area 28. Under control of controller 36, motive mechanism 44 accurately and expediently moves trolley 38 into proper position, along with take-out plate 40, in alignment with molded article 32. Upon ejection of molded article 32 via ejector mechanisms 30, vacuum cups 52 are operative to provide suction to the molded article while mechanical grippers 54 hold the same. In addition, cooling nozzles 58 may be provided for cooling the molded article prior to gripping so as to prevent damage thereof. Sensors 56 are operative to sense that vacuum cups 52 and mechanical grippers 54 or gripping means 42, in general, have a firm engagement with molded article 32. If a firm engagement is detected, controller 36 is then operative to signal trolley 38 to move out of molding area 28. Once engaged by vacuum cups 52 and mechanical grippers 54, trolley 38 is moved out of area 28 via motive mechanism 44 along with molded article 32 to a position outside of molding area 28. Since substantially the entire robot 26 is movable into and out of molding area 28 between upper and lower tiebars 24a and 24b, respectively, no overly extended cantilevered portion is required to reach into the molding area 28 for removing the part. Accordingly, excess moments and vibrations are greatly reduced allowing for the controlled and efficient movement of large molded articles from the molding area.

In the additional embodiments described above, the same manner of operation is applicable. That is, in the FIG. 5 embodiment, vertically oriented trolley 138 is movable into and out of molding area 128 in the same manner as discussed above for trolley 38. However, since a vertically oriented trolley 138 is used, trolley 138 is movable on vertically spaced guide tracks 134a and 134b preferably via rack 172 and pinion 174 as its motive mechanism. Robot 126 is preferably applicable to injection molding machine systems 111 having a small shutheight.

For the FIG. 6 embodiment, robot 226 is movable into and out of molding area 228 in the same manner as described above for robot 26 yet trolley 238 is movable on a singular guide track 234. Take-out plate 240 includes two sets of gripping means 242 for removing molded articles from either one of the mold core of mold half 220 or the mold cavity of mold half 216. Accordingly, robot 226 is applicable to either part removal scenario, i.e. core or cavity removal.

The operation of the FIG. 7 embodiment, i.e. system 311, is similar to as that discussed with system 11 and system 211 with the exception that two molding areas 328a and 328b are provided and two robots 326a and 326b are provided for movement into the areas upon signaling from the controller that finish molded articles are to be ejected from the molds defined by the multiple mold halves. Similar to the FIG. 6 embodiment, robots 326a and 326b are provided with gripping means 342 on each side of take-out plates 340 for dealing with both scenarios of molded article ejection. Preferably, a portion 334b of guide tracks 334 is movable along with supports 346 into and out of molding area 328 in synchronization with mold opening so as to allow for the free movement of the multiple movable mold platens.

In the FIG. 8 system, robot 426 is again operable in the same manner as described above. In this case, however, motive mechanism 444 is attached to trolley 438 such that robot 426 is self sufficiently movable into and out of molding area 428.

In the FIGS. 9A and 9B embodiment, system 511 functions substantially the same as that discussed for the embodiment FIG. 8 with the exception that instead of one service plate, two services plates 550a and 550b are used. Accordingly, in operation, services plate 550b is first moved into alignment with mold A including mold half 518a whereat initial molded article 532 is molded and removed. Services plate 550b is shifted to mold B including mold half 518b where initial molded article 532 is further molded to form a finish molded article 533 having select areas 555 molded. In the meantime services plate 550a is moved into alignment with mold half 518a whereat a second initial molded article 532 is ejected and received by robot 526. As shown in FIG. 9B, robot 526 is shuttled, as described above with reference to FIG. 8, for aligning services plate 550a with mold B including mold half 518b for moving second initial molded article 532 to the right handed mold. In the meantime, finish molded article 533 is released from services plate 550b for further processing. Services plate 550b then receives another finish molded article 533 from mold B which is then moved out of mold area 528 also for further processing.

In the FIG. 10 embodiment, robot 626 functions primarily the same as discussed above for robot 26 in FIGS. 1–4. However the design and location of guiding tracks 634 is much simpler since the injection molding machine shown is a tiebarless version wherein movable mold platen 614 moves on guiding rail 637 instead of tiebars.

The primary advantage of this invention is that an injection molding system and method are provided which includes an improved side entry robot for handling large parts. Another advantage of this invention is that a side entry robot for use with molding machines is provided which is able to efficiently and effectively handle large molded articles. Still another advantage of this invention is that an improved space and time efficient side entry robot is provided for removing molded articles from a mold of an injection molding machine manner. And yet another advantage of this invention is that an improved side entry robot for use with a molding machine is provided which maintains stiffness and reliability when used with large parts and when operating at high speeds. Still another advantage of this invention is that an improved side entry robot for use with a molding machine which comprises very few and simple mechanical moving parts is provided. And yet another advantage of this invention is that an improved side entry robot for use with a molding machine is provided which is movable in its entirety into a molding area for removing a molded article. And still another advantage of this invention is that an improved side entry robot for use with a molding machine is provided having a movable trolley and take-out means which are subject to only a minimum amount of torque. And yet another advantage of this invention is that an injection molding system and method including a part removal station comprised of a side entry trolley robot are provided, which robot enters entirely into the molding area of the machine for removing molded parts and which minimizes potentially damaging bending moments. And another advantage of this invention is that an injection molding system and method are provided including a molded article removal mechanism which comprises a floor based side entry robot, which design reduces vibrations and bending of the robot while a molded article is being manipulated from inside the molding area to outside the molding area.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for molding an article with an injection molding machine and removing a molded article from the injection molding machine, comprising the steps of:

clamping mold halves of the injection molding machine for forming a mold;

injecting molten resin into said mold;

separating said mold halves;

after separating said mold halves, moving a trolley including an article removal means from a position outside said mold halves to a position between said mold halves while a molded article remains between the mold halves using fixed guiding means extended between platens carrying the mold halves;

ejecting said molded article from said mold;

engaging said article with said article removal means; and removing said trolley means including article removal means from said position between said mold halves along with said molded article.

2. The method according to claim 1, wherein said step of moving comprises moving the entirety of said article removal means to said position between said mold halves.

3. The method according to claim 1, wherein said injection molding machine has sides, a top, and a bottom, wherein said means for guiding is positioned to move said trolley to said position between said mold halves from one of said sides.

4. The method according to claim 1, wherein said step of engaging comprises applying suction to said article.

5. The method according to claim 4, wherein said step of engaging further comprises applying mechanical grippers to said article.

6. The method according to claim 1, wherein said injection molding machine includes means for connecting mold platens thereof, wherein said step of guiding includes guiding said article removal means over said means for connecting.

7. The method according to claim 1, further comprising the step of sensing if said step of engaging said article has been successful prior to said step of removing.

8. The method according to claim 1, wherein said step of guiding includes the step of maintaining said article removal means between a pair of said guide means for minimizing torque acting on said article removal means.

9. The method according to claim 1, wherein said step of moving includes moving at least a portion of said trolley into said position between said mold halves synchronous with opening of said mold and moving said at least a portion of said trolley to said position outside of mold halves synchronous with closing of said mold.

10. The method according to claim 1, including the step of moving said trolley by a belt drive.

11. The method according to claim 1, including guiding the mold halves by upper and lower tie bars, and extending the guiding means over the lower tie bars.

12. The method according to claim 1, including the step of cooling the molded article before removing the molded article from the mold halves by cooling means positioned on one of the mold halves.

13. The method according to claim 1, including attaching said mold halves to fixed and movable platens of said molding machine, supporting said platens by a machine support base, wherein said guiding means comprises tracks, affixing said tracks to the support base, extending the tracks from outside the mold halves to the plane between the mold halves, and moving the trolley over the tracks.

14. The method according to claim 13, including providing the trolley with a base portion having a substantially horizontal orientation and engaging said base portion with said tracks.

15. The method according to claim 13, including providing the trolley with a base portion having a substantially vertical orientation and engaging said base portion with said tracks.

16. The method according to claim 15, wherein the base portion has an upper and lower half, and including at least one of said tracks with the upper half and engaging one of said tracks with the lower half.

17. The method according to claim 1, including connecting a pair of said guiding means with the trolley via a set of connections, and positioning the trolley on and between said pair of guiding means for minimizing torque acting on said set of connections.

18. The method according to claim 1, including synchronizing ejection of said molded article and movement of said article removal means into position between the mold halves via a control means.

19. The method according to claim 1, wherein the guiding means comprise tracks, and affixing at least one of said tracks to a machine support base.

20. The method according to claim 19, including positioning another of said tracks above the track affixed to the support base.

21. The method according to claim 1, including the step of moving said trolley via a rack, pinion and motor system.

22. The method according to claim 1, including the step of extending the guiding means beneath the mold halves.

23. The method according to claim 1, including the step of extending the guiding means into the mold open area.

24. A method of reducing moments and vibrations in a side entry robot used for removing articles from a molding area including mold halves by:

providing a movable trolley including an article removal robot;

providing a take out plate means attached to said trolley;

providing fixed guiding means of said trolley extended between platens carrying the mold halves;

providing actuation means to move said trolley in the mold area;

moving said trolley on said fixed guiding means after separation of the mold halves from a position outside the mold halves to a position between the mold halves while a molded article remains between the mold halves;

whereby substantially no overly extended cantilevered portion is required by the movable take out plate means to reach the molding area, while carrying and not carrying a molded article.

* * * * *